US011572658B2

(12) United States Patent
Motsi et al.

(10) Patent No.: US 11,572,658 B2
(45) Date of Patent: Feb. 7, 2023

(54) GRINDING METHOD AND GRINDING MEDIUM

(71) Applicant: FiberLean Technologies Limited, Par (GB)

(72) Inventors: Tafadzwa Motsi, Par (GB); David Robert Skuse, Par (GB); Jean Andre Alary, Par (GB); Andreas Borger, Par (GB); Neil Rowson, Par (GB); Thomas Richard Skuse, Par (GB)

(73) Assignee: FIBERLEAN TECHNOLOGIES LIMITED, Par (GB)

( * ) Notice: Subject to any disclaimer, the term of this patent is extended or adjusted under 35 U.S.C. 154(b) by 245 days.

(21) Appl. No.: 16/744,746

(22) Filed: Jan. 16, 2020

(65) Prior Publication Data

US 2020/0217014 A1 Jul. 9, 2020

Related U.S. Application Data

(63) Continuation of application No. 15/310,324, filed as application No. PCT/EP2015/060724 on May 14, 2015, now abandoned.

(30) Foreign Application Priority Data

May 15, 2014 (EP) .................... 14290145

(51) Int. Cl.
C09K 3/14 (2006.01)
C04B 35/111 (2006.01)
C04B 35/10 (2006.01)
C04B 35/48 (2006.01)
D21H 11/18 (2006.01)
D21D 1/00 (2006.01)

(52) U.S. Cl.
CPC ............ D21H 11/18 (2013.01); C04B 35/10 (2013.01); C04B 35/1115 (2013.01); C04B 35/48 (2013.01); C09K 3/1409 (2013.01); D21D 1/00 (2013.01); C04B 2235/3217 (2013.01); C04B 2235/3229 (2013.01)

(58) Field of Classification Search
CPC .............................. C04B 35/10; C04B 35/106
See application file for complete search history.

(56) References Cited

U.S. PATENT DOCUMENTS

| 2,939,199 | A | * | 6/1960 | Strivens | ............... | C04B 33/1315 |
| | | | | | | 264/639 |
| 4,252,544 | A | * | 2/1981 | Takahashi | ............ | C09K 3/1436 |
| | | | | | | 264/639 |
| 5,269,470 | A | | 12/1993 | Ishikawa et al. | | |
| 5,409,415 | A | * | 4/1995 | Kawanami | ............... | B24C 11/00 |
| | | | | | | 451/39 |
| 2011/0111990 | A1 | * | 5/2011 | Pershikova | ............. | C04B 35/18 |
| | | | | | | 507/219 |
| 2011/0233314 | A1 | | 9/2011 | Hart | | |
| 2011/0259537 | A1 | | 10/2011 | Husband et al. | | |
| 2012/0012031 | A1 | | 1/2012 | Husband et al. | | |
| 2012/0098170 | A1 | | 4/2012 | Jeon | | |
| 2015/0057442 | A1 | | 2/2015 | Bjorkqvist et al. | | |
| 2015/0143786 | A1 | * | 5/2015 | Merkel | ................... | C04B 38/06 |
| | | | | | | 55/523 |

FOREIGN PATENT DOCUMENTS

| CN | 201505548 U | 6/2010 |
| CN | 102240586 A | 11/2011 |
| CN | 102482167 A | 5/2012 |
| CN | 102753752 A | 10/2012 |
| EP | 0614948 A1 | 9/1994 |
| EP | 2377816 A1 | 10/2011 |
| EP | 2520555 A1 | 11/2012 |
| JP | H04135655 | 7/1989 |
| JP | H04-135655 A | 5/1992 |
| JP | H06-010286 A | 1/1994 |
| JP | H08155420 | 6/1996 |
| JP | 2005-40745 A | 2/2005 |
| JP | 2005-040745 A | 2/2005 |
| JP | 2012-514137 A | 6/2012 |
| WO | 2009018024 A1 | 2/2009 |
| WO | 2010/131016 A2 | 11/2009 |
| WO | 20100131016 A2 | 11/2009 |
| WO | 201013106 A2 | 11/2010 |
| WO | 2010131016 A2 | 11/2010 |
| WO | 2012175806 A2 | 12/2012 |
| WO | 2009/018024 A1 | 2/2020 |

OTHER PUBLICATIONS

Chinese Official Action dated Sep. 8, 2020 2020 for Chinese Patent Application No. 201910716203.3, 29 pages.
Japanese Official Action dated Feb. 25, 2021 for Japanese Patent Application No. 2020-078009, 4 pages.
Indonesian Official Action dated Jan. 3, 2020 for Japanese Patent Application No. P-00201608591, 7 pages.
Extended European Search Report dated Mar. 2, 2020 for European Patent Application No. 19209900.0, 5 pages.
Australian Examination Report dated Apr. 12, 2019 for Australian Patent Application No. 2015261414 (5 pages).
Chinese Office Action and Search Report dated Feb. 24, 2018 for Chinese Patent Application No. 201580038291.6 (25 pages).
International Preliminary Report on Patentability dated Nov. 24, 2016 for International Patent Application No. PCT/EP2015/060724 (10 pages).
International Search Report and Written Opinion dated Jul. 6, 2015 for International Patent Application No. PCT/EP2015/060724 (11 pages).

(Continued)

Primary Examiner — Pegah Parvini
(74) Attorney, Agent, or Firm — Raymond G. Arner; Pierce Atwood LLP

(57) ABSTRACT

A method for manufacturing microfibrillated cellulose, a particulate grinding medium suitable for use in said method, a material which wears rough, and a method for making said particulate grinding medium.

41 Claims, 1 Drawing Sheet

(56) References Cited

OTHER PUBLICATIONS

Translation of Japanese Office Action for Japanese Patent Application No. 2017-512433, dated Feb. 8, 2019 (3 pages).
Brazilian Official Action for Brazil Patent Application No. BR112016026678-1 dated Nov. 11, 2019, Brazil Industrial Property Journal No. 2553 (6 pages).
Chinese Official Action dated Aug. 4, 2021 for Chinese Patent Application No. 201910716203.3, 16 pages.
Canada Official Action dated May 27, 2021 for Canadian Patent Application No. 2,948,948, 4 pages.
Canada Official Action dated Nov. 15, 2021 for Canadian Patent Application No. 2,948,948, 3 pages.
Extended European Search Report dated Dec. 16, 2021 for European Patent Application No. 21194617.3, 6 pages.
Korean Official Action dated Feb. 16, 2022 for Korean Patent Application No. 10-2016-7035254, 2 pages.
Japanese Official Action dated Aug. 4, 2021 for Japanese Patent Application No. 2021-136087, 16 pages4.

* cited by examiner

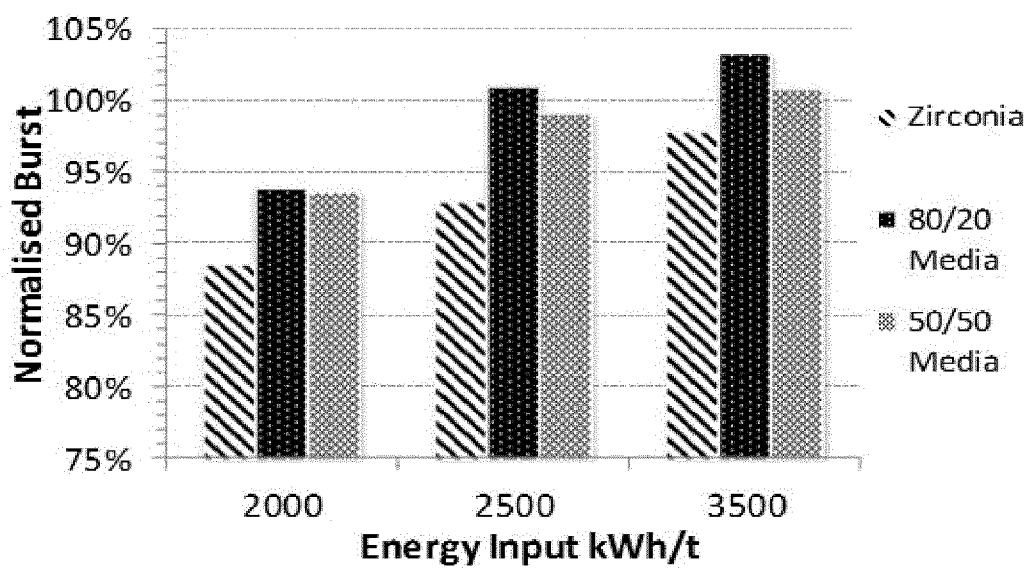

GRINDING METHOD AND GRINDING MEDIUM

CROSS REFERENCE TO RELATED APPLICATIONS

This application is a continuation of U.S. application Ser. No. 15/310,324, filed Nov. 10, 2016, which is a U.S. national phase entry under 35 U.S.C. § 371 from PCT International Application No. PCT/EP2015/060724, filed May 14, 2015, which claims the benefit of European Patent Application No. 14290145.3, filed May 14, 2014, the entire contents of which is incorporated herein by reference.

TECHNICAL FIELD

The present invention is directed to method for manufacturing microfibrillated cellulose, to a particulate grinding medium suitable for use in said method, to materials which wear rough, and to a method for making said particulate grinding medium.

BACKGROUND OF THE INVENTION

Methods and compositions comprising microfibrillated cellulose are described in WO-A-2010/131016. Paper products comprising such microfibrillated cellulose have been shown to exhibit excellent paper properties, such as paper strength. The methods described in WO-A-2010/131016 also enable the production of microfibrillated cellulose economically.

Despite the benefits seen in WO-A-2010/131016, there is ongoing need to further improve the economics of producing microfibrillated cellulose on an industrial scale, and to develop new processes for producing microfibrillated cellulose. It would also be desirable to be able to further develop or enhance one or more properties of microfibrillated cellulose.

SUMMARY OF THE INVENTION

According to a first aspect, the present invention is directed to a method for manufacturing microfibrillated cellulose, said method comprising a step of microfibrillating a fibrous substrate comprising cellulose by grinding in the presence of a particulate grinding medium which is to be removed after the completion of grinding, wherein the particulate grinding medium has a specific gravity of at least about 3.5, and wherein at the beginning of grinding the particulate grinding medium has: (i) a surface roughness of at least about 0.5 µm; or (ii) a mean coefficient of friction of at least about 0.10; or both (i) and (ii).

According to a second aspect, the present invention is directed to the use of a particulate grinding medium having a specific gravity of at least about 3.5 and i) a surface roughness of at least 0.5 µm, or (ii) a coefficient of friction of at least about 0.10, or both (i) and (ii), in the manufacture of microfibrillated cellulose.

According to a third aspect, the present invention is directed to a particulate ceramic grinding medium having (i) a surface roughness of at least about 0.5 µm, or (ii) a mean coefficient of friction of at least about 0.10, or both (i) and (ii), wherein the grinding medium is formed by sintering a composition comprising at least one of zirconia ($ZrO_2$) and alumina ($Al_2O_3$).

According to a fourth aspect, the present invention is directed to a particulate grinding medium which wears rough during grinding, for example, during grinding in a method comprising a step of microfibrillating a fibrous substrate comprising cellulose by grinding in the presence of said particulate grinding medium which is to be removed after the completion of grinding. The grinding medium may be a ceramic grinding medium.

According to a fifth aspect, the present invention is directed to a particulate grinding medium having a (i) a surface roughness of at least about 1.6 µm, or (ii) a mean coefficient of friction of at least about 0.25, or both (i) and (ii). The grinding medium may be a ceramic grinding medium.

According to a sixth aspect, the present invention is directed to a method for making a particulate ceramic grinding medium according to the third, fourth and fifth aspects, or used in the first and second aspects, said method comprising:

a. obtaining, providing or making a composition comprising raw materials suitable for making the ceramic grinding medium;
b. mixing the composition comprising raw materials, forming a mixture;
c. combining the mixture with binder, forming a bound mixture;
d. granulating the bound mixture composition by mixing the bound mixture over a period of time during which the mixing speed is reduced;
e. optionally drying the granulated composition;
f. optionally shaping the granulated composition;
g. optionally sizing the granulated composition; and
h. sintering the granulated composition.

According to a seventh aspect, there is provided a material which roughens or wears rough when agitated in the presence of a fibrous substrate comprising cellulose.

According to an eighth aspect, there is provided an unpolished particulate grinding media having a surface roughness which increases by at least 1% when subject to abrasive contact.

According to a ninth aspect, there is provided a polished particulate grinding media having a surface roughness which increases by at least 20% when subject to abrasive contact.

According to a tenth aspect, there is provided a method of manufacturing microfibrillated cellulose by microfibrillating a fibrous substrate comprising cellulose by grinding in the presence of a particulate grinding medium without replenishing the method with fresh grinding media, wherein at the beginning of the grinding the particulate grinding medium has: (i) a surface roughness of at least about 0.5 µm; or (ii) a mean coefficient of friction of at least about 0.1; or both (i) and (ii).

According to an eleventh aspect, there is provided a method of simultaneously manufacturing (a) microfibrillated cellulose and (b) a roughened particulate grinding medium, comprising grinding a fibrous substrate comprising cellulose by grinding in the presence of a particulate grinding medium which has at the beginning of grinding: (i) a surface roughness of at least about 0.5 um; or (ii) a mean coefficient of friction of at least about 0.10; or both (i) and (ii).

According to a twelfth aspect, there is provided the use of a particulate grinding medium having i) a surface roughness of at least about 0.5 µm, or (ii) a mean coefficient of friction of at least about 0.10, or both (i) and (ii), in the manufacture of microfibrillated cellulose to reduce the energy input per unit amount of microfibrillated cellulose produced.

According to a thirteenth aspect, there is provided the use of a particulate grinding medium having i) a surface roughness of at least about 0.5 μm, or (ii) a mean coefficient of friction of at least about 0.10, or both (i) and (ii), in the manufacture of microfibrillated cellulose to improve one or more properties of the microfibrillated cellulose.

BRIEF DESCRIPTION OF THE DRAWINGS

FIG. 1 is a graph comparing burst strength of paper comprising microfibrillated cellulose produced using grinding media according to an embodiment of the present invention and a comparative grinding media.

DETAILED DESCRIPTION OF THE INVENTION

Generally, the present invention is related to modifications, for example, improvements, to the methods and compositions described in WO-A-2010/131016, the entire contents of which are hereby incorporated by reference.

The Microfibrillating Method

In accordance with the first aspect of the present invention, the method comprises a step of microfibrillating a fibrous substrate comprising cellulose by grinding in the presence of a particulate grinding medium which is to be removed after the completion of grinding. By "microfibrillating" is meant a process in which microfibrils of cellulose are liberated or partially liberated as individual species or as small aggregates as compared to the fibres of the pre-microfibrillated pup. Typical cellulose fibres (i.e., pre-microfibrillated pulp) suitable for use in papermaking include larger aggregates of hundreds or thousands of individual cellulose fibrils. By microfibrillating the cellulose, particular characteristics and properties, including the characteristics and properties described herein, are imparted to the microfibrillated cellulose and the compositions comprising the microfibrillated cellulose.

In certain embodiments, the particulate grinding medium has a specific gravity of at least about 3.5. At the beginning of grinding the grinding medium has: (i) a surface roughness of at least about 0.5 μm; or (ii) a mean coefficient of friction of at least about 0.10; or both (i) and (ii). By "particulate grinding medium" is meant a medium other than the inorganic particulate material which, in certain embodiments, is co-ground with the fibrous substrate comprising cellulose. Advantageously, it has been found that a particulate grinding medium have a relatively rough surface facilitates, e.g., enhances, the production of microfibrils during the manufacture of microfibrillated cellulose. It is believed that microfibrils are formed due to the intimate interaction of the particulate grinding media surface which has a relatively rough texture and cellulose fibres during the grinding process. Without wishing to be bound by theory, it is thought that the mechanism of microfibril production is due to the relatively rough surface of the particulate grinding media 'hooking' and 'tearing' and/or 'delayering' cellulose during grinding. The interaction between the particulate grinding media and cellulose that results in microfibrillated cellulose may include media-cellulose collisions, shear of cellulose between media particulates or between media particulates and grinder wall.

As used herein, the term "at the beginning of grinding" is referring to the condition of the grinding medium before it has been used in a grinding process.

Surface roughness may be determined by optical interferometry, i.e., the measurement of the surface topography of a test surface of the particulate grinding medium relative to a reference surface, as carried out by an optical interferometer. In certain embodiments, surface roughness is determined in accordance with the following method. A representative sample of the particulate grinding medium is obtained and placed in an interferometer coupled to an optical microscope. A suitable interferometer is an Omniscan MicroXAM2. A suitable optical microscope is a Keyence Optical Microscope. A representative sample consists of 5 individual particles (e.g., beads) of the particulate grinding medium to be analysed, selected at random from any given batch of particulate grinding medium. A surface roughness for each individual particle is determined at two different locations on the surface, and the 10 results (i.e., two per particle) averaged. The size of the surface area analysed at each location on each particle is constant. A suitable interferometer operating procedures is provided in Appendix 1. In certain embodiments, surface roughness is determined in accordance with the interferometer operating procedure provided in Appendix 1, or any other suitable procedure which provides essentially the same result.

Mean coefficient of friction may be determined by tribometry, i.e., the measurement of friction on a surface, as carried out with a tribometer. A tribometer measures the magnitude of friction and wear as surfaces are rubbed over each other. In certain embodiments, mean coefficient of friction is determined in accordance with the following method. Three individual specimens (e.g., beads) of the particulate grinding medium to be analysed are obtained, and each specimen subjected to three identical runs in a tribometer. A friction coefficient is determined for each run, giving nine friction coefficient measurements (i.e., three for each specimen). A mean coefficient of friction is obtained by adding together the nine friction coefficient measurements and dividing by nine. A suitable tribometer operating procedure is provided in Appendix 2. In certain embodiments, mean coefficient of friction is determined in accordance with the tribometer operating procedure provided in Appendix 2, or any other suitable procedure which produces essentially the same result.

In certain embodiments, the particulate grinding medium has a surface roughness of from about 0.5 μm to about 5.0 μm, for example, from about 0.5 μm to about 4.0 μm, or from about 0.5 μm to about 3.0 μm, or from about 0.5 μm to about 2.5 μm, or from about 0.5 μm to about 2.0 μm, or from about 0.5 μm to about 1.5 μm, or from about 0.5 μm to about 1.0 μm, or from about 0.55 μm to about 5.0 μm, or from about 0.6μ to about 5.0 μm, or from about 0.65 μm to about 5.0 μm, or from about 0.7 μm to about 5.0 μm, or from about 0.75 μm to about 5.0 μm, or from about 0.8 μm to about 5.0 μm, or from about 0.85 μm to about 5.0 μm, or from about 0.90 to about 5.0 μm, or from about 0.95 μm to about 0.5 μm, or from about 1.0 μm to about 5.0 μm. In certain embodiments, the surface roughness is equal to or less than about 5.0 μm, for example, equal to or less than about 4.5 μm, or equal to or less than about 4.0 μm, or equal to or less than about 3.5 μm, or equal to or less than about 3.0 μm, or equal to or less than about 2.8 μm, or equal to or less than about 2.6 μm, or equal to or less than about 2.4 μm, or equal to or less than about 2.2 μm, or equal to or less than about 2.0 μm, or equal to or less than about 1.8 μm, or equal to or less than about 1.6 μm, or equal to or less than about 1.4 μm, or equal to or less than about 1.2 μm, or equal to or less than about 1.0 μm.

In certain embodiments, the particulate grinding medium has a surface roughness of at least about 0.55 μm, for example, at least about 0.6 μm, or at least about 0.65 μm, or at least about 0.7 μm, or at least about 0.75 μm, or at least about 0.8 μm, or at least about 0.85 μm, or at least about 0.9 μm, or at least about 0.95 μm, or at least about 1.0 μm, or at least about 1.05 µm, or at least about 1.1 µm, or at least about 1.15 µm, or at least about 1.2 µm, or at least about 1.25 µm, or at least about 1.3 µm, or at least about 1.35 µm, or at least about 1.4 µm, or at least about 1.45 µm, or at least about 1.5 µm, or at least about 1.55 µm, or at least about 1.6 µm, or at least about 1.65 µm, or at least about 1.7 µm, or at least about 1.75 µm, or at least about 1.8 µm, or at least about 1.85 µm, or at least about 1.9 µm, or at least about 1.95 µm, or at least about 2.0 µm, or at least about 2.05 µm, or at least about 2.1 µm, or at least about 2.15 µm, or at least about 2.2 µm, or at least about 2.25 µm, or at least about 2.3 µm, or at least about 2.35 µm, or at least about 2.4 µm, or at least about 2.45 µm, or at least about 2.5 µm, or at least about 2.55 µm, or at least about 2.6 µm, or at least about 2.65 µm, or at least about 2.7 µm, or at least about 2.75 µm, or at least about 2.8 µm, or at least about 2.85 µm, or at least about 2.9 µm, or at least about 2.95 µm, or at least about 3.0 µm.

In certain embodiments, for example, certain embodiments of the fifth aspect, the particulate grinding medium has a surface roughness of at least about 1.6 µm, for example, from about 1.6 µm to about 5.0 µm, or at least about 1.7 µm, or at least about 1.8 µm, or at least about 1.9 µm, or at least about 2.0 µm, or at least about 2.1 µm, or at least about 2.2 µm, or at least about 2.3 µm, or at least about 2.4 µm, or at least about 2.5 µm, or at least about 2.6 µm, or at least about 2.7 µm, or at least about 2.8 µm, or at least about 2.9 µm, or at least about 3.0 µm, or at least about 3.1 µm, or at least about 3.2 µm, or at least about 3.3 µm, or at least about 3.4 µm, or at least about 3.5 µm, or at least about 3.6 µm, or at least about 3.7 µm, or at least about 3.8 µm, or at least about 3.9 µm, or at least about 4.0 µm. In certain embodiments, the surface roughness is equal to or less than about 5.0 µm, for example, equal to or less than about 4.5 µm, or equal to or less than about 4.0 µm.

In certain embodiments, the particulate grinding medium has a mean coefficient of friction of from about 0.10 to about 0.50, for example, from about 0.15 to about 0.50, or from about 0.175 to about 0.50, or from about 0.20 to about 0.50, or from about 0.225 to about 0.50, or from about 0.25 to about 0.50, or from about 0.275 to about 0.50, or from about 0.30 to about 0.50, or from about 0.325 to about 0.50, or from about 0.35 to about 0.50, or from about 0.375 to about 0.50, or from about 0.40 to about 0.50.

In certain embodiments, the mean coefficient of friction is equal to or less than about 0.50, for example, equal to or less than about 0.48, or equal to or less than about 0.46, or equal to or less than about 0.44, or equal to or less than about 0.42, or equal to or less than about 0.40, or equal to or less than about 0.39, or equal to or less than about 0.38, or equal to or less than about 0.37, or equal to or less than about 0.36, or equal to or less than about 0.35.

In certain embodiments, the mean coefficient of friction is at least about 0.15, for example, at least about 0.175, or at least about 0.20, or at least about 0.225, or at least about 0.25, or at least about 0.275, or at least about 0.30.

In certain embodiments, grinding medium has a surface roughness of from about 0.5 µm to about 5.0 µm and a mean coefficient of friction of from about 0.10 to about 0.50, for example, a surface roughness of from about 0.75 µm to about 5.0 µm and a mean coefficient of friction of from about 0.10 to about 0.50, or a surface roughness of from about 1.0 µm to about 5.0 µm and a mean coefficient of friction of from about 0.10 to about 0.50, or a surface roughness of from about 1.0 µm to about 5.0 µm and a mean coefficient of friction of from about 0.10 to about 0.50, or a surface roughness of from about 0.5 µm to about 5.0 µm and a mean coefficient of friction of from about 0.20 to about 0.50, or a surface roughness of from about 0.5 µm to about 5.0 µm and a mean coefficient of friction of from about 0.25 to about 0.50, or a surface roughness of from about 0.5 µm to about 5.0 µm and a mean coefficient of friction of from about 0.30 to about 0.50, or a surface roughness of from about 0.75 µm to about 4.0 µm and a mean coefficient of friction of from about 0.20 to about 0.40, or a surface roughness of from about 0.75 µm to about 3.5 µm and a mean coefficient of friction of from about 0.25 to about 0.40.

In certain embodiments, for example, certain embodiments of the fifth aspect, the particulate grinding medium has a mean coefficient of friction of at least about 0.26, for example, at least about 0.28, or at least about 0.30, or at least about, or at least about 0.32, or at least about 0.34, or at least about 0.36, or at least about 0.38, or at least about 0.40, or at least about 0.42, or at least about 0.44, or at least about 0.46, or at least about 0.48, or at least about 0.50. In certain embodiments, the coefficient of friction is no greater than about 0.80, for example, no greater than about 0.75, or no greater than about 0.70, or no greater than about 0.65, or no greater than about 0.60, or no greater than about 0.55.

In certain embodiments, after the completion of grinding, the surface roughness of the particulate grinding medium is at least about 90% of the surface roughness at the beginning of grinding, for example, at least about 92% of the surface roughness, or at least about 94% of the surface roughness, or at least about 96% of the surface roughness or at least about 98% of the surface roughness, or at least about 99% of the surface roughness at the beginning of grinding, as determined in accordance with the methods described herein. As used herein, the term "after the completion of grinding" is referring to the condition of the grinding medium following use in a method according to the first aspect of the invention, i.e., a method for manufacturing microfibrillated cellulose comprising a step of microfibrillating a fibrous substrate comprising cellulose by grinding in the presence of the grinding medium, for example, a method for manufacturing microfibrillated cellulose having a fibre steepness of from 20 to 50. Said method may be conducted in the presence or absence of grindable inorganic particulate material.

In certain embodiments, after the completion of grinding, the surface roughness is at least the same as the surface roughness at the beginning of grinding, as determined in accordance with the methods described herein. In certain embodiments, the particulate grinding medium wears rough during grinding, such that, after completion of grinding, the surface roughness is greater than the surface roughness at the beginning of grinding, as determined in accordance with the methods described herein. For example, in certain embodiments, the surface roughness increases by at least about 1% during grinding (i.e., the surface roughness at the end of the grinding process is at least about 1% greater than the surface roughness at the beginning of the grinding process), or increases by at least about 2% during grinding, or increases by at least 3% during grinding, or increases by at least 4% during grinding, or increases by at least 5% during grinding, or increases by at least 6% during grinding, or increases by at least 7% during grinding, or increases by at least 8% during grinding, or increases by at least 9% during grinding, or increases by at least 10% during grinding, or increases by at least 11% during grinding, or increases by at least 12% during grinding, or increases by at least 13% during grinding, or increases by at least 14% during grinding, or increases by at least 15% during grinding, or increases by at least 16% during grinding, or increases by at least 17% during grinding, or increases by at least 18% during grinding, or increases by at least 19% during grinding, or increases by up to about 20% during grinding. The provision and use of a grinding medium which wears rough (or at least retains at least 90% of its initial surface roughness) during grinding is contrary to conventional grinding media, which would normally smoothen during grinding. The provision and use of a grinding medium which already possesses a surface roughness greater than that of conventional grinding media and which additionally wears rough during the grinding process may provide additional benefits, such as, for example, continued savings in total energy input during the grinding process, and/or additional improvements in one or more properties, e.g., a strength property of the microfibrillated cellulose and/or paper products (e.g., burst strength) comprising the microfibrillated cellulose, and/or less, or even no, need to replenish the grinding process with fresh grinding media having the required surface roughness and/or coefficient of friction.

Thus, in certain embodiments, there is provided a method of manufacturing microfibrillated cellulose by microfibrillating a fibrous substrate comprising cellulose by grinding in the presence of a particulate grinding medium, as described herein, without replenishing the method with fresh grinding media, wherein at the beginning of the grinding the particulate grinding medium has: (i) a surface roughness of at least about 0.5 um; or (ii) a mean coefficient of friction of at least about 0.10; or both (i) and (ii).

Further, according to certain embodiments, there is provided a method of simultaneously manufacturing (a) microfibrillated cellulose and (b) a roughened particulate grinding medium, comprising grinding a fibrous substrate comprising cellulose by grinding in the presence of a particulate grinding medium, as described herein, which has at the beginning of grinding: (i) a surface roughness of at least about 0.5 um; or (ii) a mean coefficient of friction of at least about 0.10; or both (i) and (ii).

Alternatively or additionally, advantageously additionally, in certain embodiments, after the completion of grinding, the mean coefficient of friction is at least about 90% of the mean coefficient of friction at the beginning of grinding, for example, at least about 92% of the mean coefficient of friction at the beginning of grinding, or at least about 94% of the mean coefficient of friction at the beginning of grinding, or at least about 96% of the mean coefficient of friction at the beginning of grinding, or at least about 98% of the mean coefficient of friction at the beginning of grinding, or at least about 99% of the mean coefficient of friction at the beginning of grinding, as determined in accordance with the methods described herein. In certain embodiments, after the completion of grinding, the mean coefficient of friction is at least the same as the surface roughness at the beginning of grinding, as determined in accordance with the methods described herein. In certain embodiments, the particulate grinding medium wears rough during grinding, such that, after completion of grinding, the mean coefficient of friction is greater than the mean coefficient of friction at the beginning of grinding, as determined in accordance with the methods described herein. For example, in certain embodiments, the mean coefficient of friction increases by at least about 1% during grinding, or increases by at least about 2% during grinding, or increases by at least 3% during grinding, or increases by at least 4% during grinding, or increases by at least 5% during grinding, or increases by at least 6% during grinding, or increases by at least 7% during grinding, or increases by at least 8% during grinding, or increases by at least 9% during grinding, or increases by at least 10% during grinding, or increases by at least 11% during grinding, or increases by at least 12% during grinding, or increases by at least 13% during grinding, or increases by at least 14% during grinding, or increases by at least 15% during grinding, or increases by at least 16% during grinding, or increases by at least 17% during grinding, or increases by at least 18% during grinding, or increases by at least 19% during grinding, or increases by up to about 20% during grinding.

It will be further understood that in certain embodiments, a relatively small number of particles (e.g., five or less particles in a representative sample of 100 particles) having a surface roughness less than 0.5 µm and/or a mean coefficient of less than 0.10 may be present as a by product of the process by which the particles of the grinding medium are made or handled.

In certain embodiments, the particulate grinding medium has a specific gravity of at from about 3.5 to about 8.0, for example, from about 3.5 to about 7.0, or from about 3.5 to about 6.5, or a specific gravity of at least about 3.6, or at least about 3.7, or at least about 3.8, or at least about 3.9, or at least about 4.0, or at least about 4.1, or at least about 4.2, or at least about 4.3, or at least about 4.4, or at least about 4.5, or at least about 4.6, or at least about 4.7, or at least about 4.8, or at least about 4.9, or at least about 5.0, or at least about 5.1, or at least about 5.2, or at least about 5.3, or at least about 5.4, or at least about 5.5, or at least about 5.6, or at least about 5.6, or at least about 5.7, or at least about 5.8, or least about 5.9, or at least about 6.0. Higher specific gravities are preferred since such grinding media have a reduced, or even no, tendency to elutriate from the grinding vessel, e.g., a tower mill, during manufacture of the microfibrillated cellulose. In addition, higher specific gravities allow for an increase in mill productivity and utilization. This is because denser media result in higher motor power draw (i.e., greater motor efficiency); there is more energy transferred to the particles per unit time within the grinder volume when using higher specific gravity media. As a result, the time to reach a target energy or particle size is reduced.

In certain embodiments, the particulate grinding medium comprises, consists essentially of, or consists of, particles having a particle size in the range of from about 0.5 mm to about 15 mm, for example, from about 0.5 mm to about 12 mm, for example, from about 1 mm to about 10 mm, or from about 1 mm to about 8 mm, or from about 1 mm to about 6 mm, or from about 1 mm to about 5 mm, or from about 1 mm to about 4 mm, or from about 1 mm to about 3 mm. The term 'particle size' used in this context is understood by persons of skill in the art to mean that the particles pass through a sieve having an aperture size corresponding to the size of the particles. Thus, by way of example, passing particles through a sieve having an 8 mm aperture size would produce grinding medium particles with a particle size of no greater than 8 mm. Similarly, a grinding medium having a particle size of from about 1 mm to about 3 mm means that the grinding medium could be obtained using screens with aperture sizes of about 1 mm (minimum) and about 3 mm (maximum), respectively.

The particulate grinding medium may be formed of natural or synthetic material, for example, are formed of a dense, hard mineral, ceramic or metallic material suitable for use as a grinding media. In certain embodiments, the particulate grinding medium is a ceramic grinding medium. Such materials include alumina, zirconia, zirconium silicate, yttria, ceria, or yttria and/or ceria stabilized zirconia, and mixtures thereof. In certain embodiments, the particulate ceramic grinding medium may have a composite structure of more than one material, e.g., alumina and zirconia, or alumina and zirconium silicate, or alumina and mullite. In certain embodiments, the particulate grinding medium does not consist exclusively of mullite. In certain embodiments, the particulate grinding medium does not contain mullite.

The particulate grinding medium may be formulated to restrict the $SiO_2$ content to a specific low level, e.g., less than about 4 weight %, and preferably not more than about 2 weight %. The particulate grinding medium may contain no more than 10 weight percent iron oxide, for example, no more than 8 weight % iron oxide, or no more than 6 weight % iron oxide, or no more than 4 weight % iron oxide, or no more than 2 weight iron oxide, or no more than 1 weight % iron oxide.

In certain embodiments of the first or second aspects, the particulate grinding medium is a particulate grinding medium according to the third aspect, as described in detail below.

The particulate grinding media may comprise particles of any suitable shape, e.g., balls, beads, cylpebs, pellets, rods, discs, cubes, toroids, cones, and the like.

In certain embodiments, the particulate grinding media comprises substantially spherical particles, e.g., balls and/or beads. For example, the grinding media may comprise at least 10% by weight of substantially spherical particles, or may comprise at least 20% by weight of substantially spherical particles, or may comprise at least 30% by weight of substantially spherical particles, or may comprise at least 40% by weight of substantially spherical particles, or may comprise at least 50% by weight of substantially spherical particles, or may comprise at least 60% by weight of substantially spherical particles, or may comprise at least 70% by weight substantially spherical particles, or may comprise at least 80% by weight of substantially spherical particles, or may comprise at least 90% by weight of substantially spherical particles, or may comprise essentially only (e.g., 95% by weight or more, or at least 99% by weight) substantially spherical particles.

In certain embodiments, the grinding medium comprises rod-shaped particles, for example, rod-shaped particles having an aspect ratio of equal to or greater than about 2:1.

The rod-shaped particles are solid bodies which have an axis running the length of the body about which an outer surface is defined, and opposite end surfaces. The outer surface and the opposite end surfaces together define the body. In certain embodiments, the lengthwise axis is substantially rectilinear, by which we mean that the line representing the shortest distance between the two ends falls completely within the body. In other embodiments, the rod-shaped particles may take an arcuate form in which the axis is curvilinear and the line representing the shortest distance does not fall completely within the body. Mixtures of rod-shaped bodies having a rectilinear axis and bodies having an arcuate form are contemplated, as are embodiments in which substantially all (for example 90% by weight or 95% by weight or 99% by weight) of the rod-shaped particles of aspect ratio of 2:1 or more either have the rectilinear form or have the arcuate form.

In certain embodiments, the cross section of the rod-shaped particles is substantially constant along the length of the particle. By "substantially constant" is meant that the major dimension of the cross-section does not vary by, for example, more than 20% or by more than 10% or by more than 5%. In another embodiment, the cross-section of the rod-shaped particles varies along the length of the particle by, for example, by more than 20%. For example, the body of the rod-shaped particle may take the form of a barrel in which the cross-section at each of the ends of the body of the particle is less than a cross-section measured between the ends; or for example, the body of the rod-shaped particle may take the form of an inverse barrel in which the cross-section at each of the ends of the particle is greater than a cross-section measured between the ends. The cross-sectional shape of the rod-shaped particles may be symmetrical or asymmetrical. For example, the cross-sectional shape may be circular or substantially circular, or may be substantially ovoid. Other shapes include angular shapes such as triangles, squares, rectangles, stars (five and six-pointed), diamonds, etc. The boundary between the outer lengthwise surface and the opposite end surfaces may be angular, i.e. having a discrete sharp boundary, or non-angular, i.e. being rounded or radiused. The end surfaces may be flat, convex or concave.

As previously noted, the aspect ratio of the rod-shaped particles is advantageously 2:1 or more than 2:1. The aspect ratio is to be understood as the ratio of the longest dimension of the particle to the shortest dimension. For present purposes, the longest dimension is the axial length of the rod-shaped particles. Where the particle has a constant cross-section along its length, the shortest dimension for purposes of defining the aspect ratio is the largest dimension of the cross-section which passes through the geometric centre of the particle cross-section. Where the cross-section varies along the length of the particle, the shortest dimension for purposes of defining the aspect ratio is the largest dimension at the point at which the cross-section is at a maximum. Where the particle has an irregular shaped cross-section, the shortest dimension for the purposes of defining the aspect ratio is the maximum transverse dimension perpendicular to the axis of the rod-shaped particle. An example of suitable rod-shaped particles for use in certain embodiments of the invention are particles having a substantially rectilinear axis and a substantially circular cross section.

Another example of suitable rod-shaped particles for use in certain embodiments of the invention are particles having a arcuate form and a substantially circular cross-section.

In both these examples, the boundary between the outer lengthwise surface and the opposite end surfaces is rounded and the ends are generally flat or convex. In certain embodiments, the rod-shaped particles have an aspect ratio of 2.5:1 or more than 2.5:1, or an aspect ratio of 3:1 or more than 3:1, or an aspect ratio of 4:1 or more than 4:1, or an aspect ratio of 5:1 or more than 5:1, or an aspect ratio of 6:1 or more than 6:1. The aspect ratio may be 10:1 or less than 10:1, or may be 9:1 or less than 9:1 or may be 8:1 or less than 8:1 or may be 7:1 or less than 7: or may be 6:1 or less than 6:1 or may be 5:1 or less than 5:1. The aspect ratio may be in the range of from 2:1 to 10:1 or may be in the range of from 2:1 to 5:1 or may be in the range 3:1 to 8:1 or may be in the range of from 3:1 to 6:1.

In certain embodiments, the axial length of the rod-shaped particles ranges from about 1 mm to about 5 mm, or from about 2 mm to about 4 mm. In another embodiment, the rod length is less than about 3 mm.

In certain embodiments, the grinding media may comprise (i.e., in addition to the rod-shaped particles having an aspect ratio of 2:1 or more) other particles selected from rod-shaped particles having an aspect ratio less than 2:1 and particles having other shapes such as spheres, cylpebs, cubes, discs, toroids, cones, and the like. For example, the grinding media may comprise at least 10% by weight of rod-shaped particles having an aspect ratio of 2:1 or more, or may comprise at least 20% by weight of rod-shaped particles having an aspect ratio of 2:1 or more, or may comprise at least 30% by weight of rod-shaped particles having an aspect ratio of 2:1 or more, or may comprise at least 40% by weight of rod-shaped particles having an aspect ratio of 2:1 or more, or may comprise at least 50% by weight of rod-shaped particles having an aspect ratio of 2:1 or more, or may comprise at least 60% by weight of rod-shaped particles having an aspect ratio of 2:1 or more, or may comprise at least 70% by weight of rod-shaped particles having an aspect ratio of 2:1 or more, or may comprise at least 80% by weight of rod-shaped particles having an aspect ratio of 2:1 or more, or may comprise at least 90% by weight of rod-shaped particles having an aspect ratio of 2:1 or more, or may comprise essentially only (e.g. 95% by weight or more) rod-shaped particles having an aspect ratio of 2:1 or more. It will be further understood that in certain embodiments of the invention, a relatively small number of shaped particles having an aspect ratio smaller than 2:1 may be present as a by-product of the process by which the particles are made or handled. Similarly, rod-shaped particles having a relatively high aspect ratio such as, for example, greater than about 10:1, may be added to the grinding process, in which case these rods may snap to their own preferred length during the grinding process. It will also be understood that as the grinding process progresses the shape of at least some of the rod-shaped particles may evolve such that the ends round off, and the aspect ratio lowers, and in some cases the virgin rod-shaped particles may eventually become small spheres, so a typical mature grinder may contain rods, worn rods and even spheres. Thus, a "worked-in" sample of rod-shaped particles which originally had an aspect ratio at least 2:1 or more may contain a majority (if worked long enough) of particles somewhat different in shape to the rod-shaped particles comprised in the virgin media. The grinder may be topped up with fresh media comprising rod-shaped particles having an aspect ratio of 2:1 or more.

The fibrous substrate comprising cellulose may be derived from any suitable source, such as wood, grasses (e.g., sugarcane, bamboo) or rags (e.g., textile waste, cotton, hemp or flax). The fibrous substrate comprising cellulose may be in the form of a pulp (i.e., a suspension of cellulose fibres in water), which may be prepared by any suitable chemical or mechanical treatment, or combination thereof. For example, the pulp may be a chemical pulp, or a chemithermomechanical pulp, or a mechanical pulp, or a recycled pulp, or a papermill broke, or a papermill waste stream, or waste from a papermill, or a combination thereof. The cellulose pulp may be beaten (for example in a Valley beater) and/or otherwise refined (for example, processing in a conical or plate refiner) to any predetermined freeness, reported in the art as Canadian standard freeness (CSF) in $cm^3$. CSF means a value for the freeness or drainage rate of pulp measured by the rate that a suspension of pulp may be drained. For example, the cellulose pulp may have a Canadian standard freeness of about 10 $cm^3$ or greater prior to being microfibrillated. The cellulose pulp may have a CSF of about 700 $cm^3$ or less, for example, equal to or less than about 650 $cm^3$, or equal to or less than about 600 $cm^3$, or equal to or less than about 550 $cm^3$, or equal to or less than about 500 $cm^3$, or equal to or less than about 450 $cm^3$, or equal to or less than about 400 $cm^3$, or equal to or less than about 350 $cm^3$, or equal to or less than about 300 $cm^3$, or equal to or less than about 250 $cm^3$, or equal to or less than about 200 $cm^3$, or equal to or less than about 150 $cm^3$, or equal to or less than about 100 $cm^3$, or equal to or less than about 50 $cm^3$. The cellulose pulp may then be dewatered by methods well known in the art, for example, the pulp may be filtered through a screen in order to obtain a wet sheet comprising at least about 10% solids, for example at least about 15% solids, or at least about 20% solids, or at least about 30% solids, or at least about 40% solids. The pulp may be utilised in an unrefined state, that is to say without being beaten or dewatered, or otherwise refined.

The step of microfibrillating may be carried out in any suitable apparatus, including but not limited to a refiner. In one embodiment, the microfibrillating step is conducted in a grinding vessel. The microfibrillated step may be carried out in an aqueous environment, i.e., under wet-grinding conditions. In another embodiment, the microfibrillating step is carried out in a homogenizer.

In certain embodiments, the microfibrillating process, e.g., grinding, is carried out in the presence of grindable inorganic particulate material. In certain embodiments, the grinding is carried out in the absence of grindable inorganic particulate material.

The grinding medium may be present in an amount up to about 70% by volume of the charge. The grinding media may be present in amount of at least about 10% by volume of the charge, for example, at least about 20% by volume of the charge, or at least about 30% by volume of the charge, or at least about 40% by volume of the charge, or at least about 50% by volume of the charge, or at least about 60% by volume of the charge. In certain embodiments, the grinding medium is present in an amount from about 30 to about 70% by volume of the charged, for example, from about 40 to about 60% by volume of the charge, for example, from about 45 to about 55% by volume of the charge.

By 'charge' is meant the composition which is the feed fed to the grinder vessel. The charge includes water (when present), grinding media, fibrous substrate comprising cellulose and inorganic particulate material (when present), and any other optional additives (when present) as described herein.

The grinding may be performed in a vertical mill or a horizontal mill.

In certain embodiments, the grinding is performed in a grinding vessel, such as a tumbling mill (e.g., rod, ball and autogenous), a stirred mill (e.g., SAM or IseMill), a tower mill, a stirred media detritor (SMD), or a grinding vessel comprising rotating parallel grinding plates between which the feed to be ground is fed.

In one embodiment, the grinding vessel is a vertical mill, for example, a stirred mill, or a stirred media detritor, or a tower mill.

The vertical mill may comprise a screen above one or more grind zones. In an embodiment, a screen is located adjacent to a quiescent zone and/or a classifier. The screen may be sized to separate grinding media from the product aqueous suspension comprising microfibrillated cellulose and inorganic particulate material and to enhance grinding media sedimentation.

In one embodiment, the grinding vessel is a tower mill. The tower mill may comprise a quiescent zone above one or more grinding zones. A quiescent zone is a region located towards the top of the interior of tower mill in which minimal or no grinding takes place and comprises microfibrillated cellulose and (when present) inorganic particulate material. The quiescent zone is a region in which particles of the grinding medium sediment down into the one or more grinding zones of the tower mill.

The tower mill may comprise a vertical impeller shaft equipped with a series of impeller rotor disks throughout its length. The action of the impeller rotor disks creates a series of discrete grinding zones throughout the mill.

The tower mill may comprise a classifier above one or more grinding zones. In an embodiment, the classifier is top mounted and located adjacent to a quiescent zone. The classifier may be a hydrocyclone.

The tower mill may comprise a screen above one or more grind zones. In an embodiment, a screen is located adjacent to a quiescent zone and/or a classifier. The screen may be sized to separate grinding media from the product aqueous suspension comprising microfibrillated cellulose and (when present) inorganic particulate material and to enhance grinding media sedimentation.

In another embodiment, the grinding is performed in a screened grinder, for example, a stirred media detritor. The screened grinder may comprise one or more screen(s) sized to separate grinding media from the product aqueous suspension comprising microfibrillated cellulose and inorganic particulate material. The screened grinder may comprise one or more screen(s) having a nominal aperture size of at least about 250 µm, for example, the one or more screens may have a nominal aperture size of at least about 300 µm, or at least about 350 µm, or at least about 400 µm, or at least about 450 µm, or at least about 500 µm, or at least about 550 µm, or at least about 600 µm, or at least about 650 µm, or at least about 700 µm, or at least about 750 µm, or at least about 800 µm, or at least about 850 µm, or at or least about 900 µm, or at least about 1000 µm, or at least about 1250 µm, or at least about 1500 µm. In certain embodiments, the screened grinder may comprise one or more screen(s) having a nominal aperture size of up to about 4000 µm, for example, up to about 3500 µm, or up to about 3000 µm, or up to about 2500 µm, or up to about 2000 µm.

In certain embodiments, at least about 5% by weight of the initial solids content may be fibrous substrate comprising cellulose, for example, at least about 10%, or at least about 15%, or at least about 20% by weight of the initial solids content may be fibrous substrate comprising cellulose.

As described herein, the total amount of energy used in the method (i.e., total energy input) may be less than that used in a comparable method in which the particulate grinding medium has at the beginning of grinding (i) a surface roughness which is less rough and/or (ii) a lesser mean coefficient of friction than that required by the method of the first aspect of the present invention. As such, the present inventors have surprisingly found that a cellulose pulp can be microfibrillated at relatively lower energy input when it is ground in the presence of particulate grinding medium having i) a surface roughness of at least about 0.5 µm, or (ii) a mean coefficient of friction of at least about 0.10, or both (i) and (ii). In other words, the particulate grinding medium may be used in order to reducing the energy input per unit amount of microfibrillated cellulose produced. Further, as described above, in certain embodiments, the use of a particulate grinding medium having i) a surface roughness of at least about 0.5 µm, or (ii) a mean coefficient of friction of at least about 0.10, or both (i) and (ii) may improve one or more properties of the microfibrillated cellulose, e.g., a strength property of the microfibrillated cellulose and/or paper products (e.g., burst strength) comprising the microfibrillated cellulose.

When present, the inorganic particulate material may, for example, be an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

In certain embodiments, the inorganic particulate material comprises or is calcium carbonate. Hereafter, certain embodiments of the invention may tend to be discussed in terms of calcium carbonate, and in relation to aspects where the calcium carbonate is processed and/or treated. The invention should not be construed as being limited to such embodiments.

The particulate calcium carbonate used in certain embodiments of the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness.

Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in certain embodiments of the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of certain embodiments of the present invention. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas. The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral, all of which are suitable for use in certain embodiments of the present invention, including mixtures thereof.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

In some circumstances, minor additions of other minerals may be included, for example, one or more of kaolin, calcined kaolin, wollastonite, bauxite, talc or mica, could also be present.

When the inorganic particulate material is obtained from naturally occurring sources, it may be that some mineral impurities will contaminate the ground material. For example, naturally occurring calcium carbonate can be present in association with other minerals. Thus, in some embodiments, the inorganic particulate material includes an amount of impurities. In general, however, the inorganic particulate material used in certain embodiments of the invention will contain less than about 5% by weight, preferably less than about 1% by weight, of other mineral impurities.

The inorganic particulate material may have a particle size distribution such that at least about 10% by weight, for example at least about 20% by weight, for example at least about 30% by weight, for example at least about 40% by weight, for example at least about 50% by weight, for example at least about 60% by weight, for example at least about 70% by weight, for example at least about 80% by weight, for example at least about 90% by weight, for example at least about 95% by weight, or for example about 100% of the particles have an e.s.d of less than 2 μm.

In certain embodiments, at least about 50% by weight of the particles have an e.s.d of less than 2 μm, for example, at least about 55% by weight of the particles have an e.s.d of less than 2 μm, or at least about 60% by weight of the particles have an e.s.d of less than 2 μm Unless otherwise stated, particle size properties referred to herein for the inorganic particulate materials are as measured in a well known manner by sedimentation of the particulate material in a fully dispersed condition in an aqueous medium using a Sedigraph 5100 machine as supplied by Micromeritics Instruments Corporation, Norcross, Ga., USA (*web-site: www.micromeritics.com*), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value.

Alternatively, where stated, the particle size properties referred to herein for the inorganic particulate materials are as measured by the well known conventional method employed in the art of laser light scattering, using a Malvern Mastersizer S machine as supplied by Malvern Instruments Ltd (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value.

Thus, in another embodiment, the inorganic particulate material may have a particle size distribution, as measured by the well known conventional method employed in the art of laser light scattering, such that at least about 10% by volume, for example at least about 20% by volume, for example at least about 30% by volume, for example at least about 40% by volume, for example at least about 50% by volume, for example at least about 60% by volume, for example at least about 70% by volume, for example at least about 80% by volume, for example at least about 90% by volume, for example at least about 95% by volume, or for example about 100% by volume of the particles have an e.s.d of less than 2 μm.

In certain embodiments, at least about 50% by volume of the particles have an e.s.d of less than 2 μm, for example, at least about 55% by volume of the particles have an e.s.d of less than 2 μm, or at least about 60% by volume of the particles have an e.s.d of less than 2 μm Details of the procedure that may be used to characterise the particle size distributions of mixtures of inorganic particle material and microfibrillated cellulose using the well known conventional method employed in the art of laser light scattering are provided in WO-A-2010/131016 at page 40, line 32 to page 41, line 34, the entire contents of which are hereby incorporated by reference.

Another preferred inorganic particulate material for use in the method according to the first aspect of the present invention is kaolin clay. Hereafter, this section of the specification may tend to be discussed in terms of kaolin, and in relation to aspects where the kaolin is processed and/or treated. The invention should not be construed as being limited to such embodiments. Thus, in some embodiments, kaolin is used in an unprocessed form.

Kaolin clay used in certain embodiments of this invention may be a processed material derived from a natural source, namely raw natural kaolin clay mineral. The processed kaolin clay may typically contain at least about 50% by weight kaolinite. For example, most commercially processed kaolin clays contain greater than about 75% by weight kaolinite and may contain greater than about 90%, in some cases greater than about 95% by weight of kaolinite.

Kaolin clay used in the present invention may be prepared from the raw natural kaolin clay mineral by one or more other processes which are well known to those skilled in the art, for example by known refining or beneficiation steps.

For example, the clay mineral may be bleached with a reductive bleaching agent, such as sodium hydrosulfite. If sodium hydrosulfite is used, the bleached clay mineral may optionally be dewatered, and optionally washed and again optionally dewatered, after the sodium hydrosulfite bleaching step.

The clay mineral may be treated to remove impurities, e. g. by flocculation, flotation, or magnetic separation techniques well known in the art. Alternatively the clay mineral used in the first aspect of the invention may be untreated in the form of a solid or as an aqueous suspension.

The process for preparing the particulate kaolin clay used in certain embodiments of the present invention may also include one or more comminution steps, e.g., grinding or milling. Light comminution of a coarse kaolin is used to give suitable delamination thereof. The comminution may be carried out by use of beads or granules of a plastic (e. g. nylon), sand or ceramic grinding or milling aid. The coarse kaolin may be refined to remove impurities and improve physical properties using well known procedures. The kaolin clay may be treated by a known particle size classification procedure, e.g., screening and centrifuging (or both), to obtain particles having a desired $d_{50}$ value or particle size distribution.

The relative amounts of inorganic particulate material and cellulosic material, including microfibrillated cellulose, may vary in a ratio of from about 99.5:0.5 to about 0.5:99.5, based on the dry weight of inorganic particulate material and cellulosic material, for example, a ratio of from about 99.5:0.5 to about 50:50 based on the dry weight of inorganic particulate material and cellulosic material. For example, the ratio of the amount of inorganic particulate material and cellulosic material may be from about 99.5:0.5 to about 70:30. In certain embodiments, the ratio of inorganic particulate material to cellulosic material is about 80:20, or for example, about 85:15, or about 90:10, or about 91:9, or about 92:8, or about 93:7, or about 94:6, or about 95:5, or about 96:4, or about 97:3, or about 98:2, or about 99:1.

In certain embodiment, the microfibrillated cellulose obtainable by the method of the first aspect comprises up to about 80% by weight water, for example, up to about 75% water, or up to about 70%, or up to about 65% by weight water, or up to about 60% by weight water, or up to about 55% by weight water, or up to about 50% by weight water, or up to about 45% by weight water, or up to about 40% by weight water, or up to about 35% by weight water, or up to about 30% by weight water, or up to about 25% by weight water.

In certain embodiments, microfibrillated cellulose obtainable by the method of the first aspect comprises from about 50 to about 70% by weight water, for example, from about 55 to about 65% by weight water, or from about 60 to about 70% by weight water, or from about 60 to about 65% by weight water, or from about 65 to about 70% by weight water.

The microfibrillated cellulose obtainable by the method of the first aspect may comprise other optional additives including, but not limited to, dispersant, biocide, suspending aids, salt(s) and other additives, for example, starch or carboxy methyl cellulose or polymers, which may facilitate the interaction of mineral particles and fibres.

In certain embodiments in which a grindable inorganic particulate is present, the fibrous substrate comprising cellulose and inorganic particulate material are present in the aqueous environment at an initial solids content of at least about 2 wt %, of which at least about 2% by weight is fibrous substrate comprising cellulose, for example, an initial solids content of from about 2% by weight to about 20% by weight, or from about 4% by weight to about 15% by weight, or from about 5% by weight to about 12% by weight, or from about 7% by weight to about 10% by weight. In such embodiments, at least about 5% by weight of the initial solids content may be fibrous substrate comprising cellulose, for example, at least about 10%, or at least about 15%, or at least about 20% by weight of the initial solids content may be fibrous substrate comprising cellulose. In certain embodiments, no more than about 40% by weight of the initial solids content is fibrous substrate comprising cellulose, for example, no more than about 30% by weight of the initial solids content is fibrous substrate comprising cellulose, or no more than about 25% by weight of the initial solids content is fibrous substrate comprising cellulose The grinding process may include a pre-grinding step in which coarse inorganic particulate is ground in a grinder vessel to a predetermined particle size distribution, after which fibrous material comprising cellulose is combined with the pre-ground inorganic particulate material and the grinding continued in the same or different grinding vessel until the desired level of microfibrillation has been obtained.

As the suspension of material to be ground may be of a relatively high viscosity, a suitable dispersing agent may be added to the suspension prior to or during grinding. The dispersing agent may be, for example, a water soluble condensed phosphate, polysilicic acid or a salt thereof, or a polyelectrolyte, for example a water soluble salt of a poly (acrylic acid) or of a poly(methacrylic acid) having a number average molecular weight not greater than 80,000. The amount of the dispersing agent used would generally be in the range of from 0.1 to 2.0% by weight, based on the weight of the dry inorganic particulate solid material. The suspension may suitably be ground at a temperature in the range of from 4° C. to 100° C.

Other additives which may be included during the microfibrillation step include: carboxymethyl cellulose, amphoteric carboxymethyl cellulose, oxidising agents, 2,2,6,6-Tetramethylpiperidine-1-oxyl (TEMPO), TEMPO derivatives, and wood degrading enzymes.

In certain embodiments, the product of the process is treated to remove at least a portion or substantially all of the water to form a partially dried or essentially completely dried product. For example, at least about 10% by volume, for example, at least about 20% by volume, or at least about 30% by volume, or least about 40% by volume, or at least about 50% by volume, or at least about 60% by volume, or at least about 70% by volume or at least about 80% by volume or at least about 90% by volume, or at least about 100% by volume of water in product of the grinding process may be removed. Any suitable technique can be used to remove water from the product including, for example, by gravity or vacuum-assisted drainage, with or without pressing, or by evaporation, or by filtration, or by a combination of these techniques. The partially dried or essentially completely dried product will comprise microfibrillated cellulose and optionally inorganic particulate material and any other optional additives that may have been added prior to drying. The partially dried or essentially completely dried product may be stored or packaged for sale. The partially dried or essentially completely dried product may be optionally re-hydrated and incorporated in papermaking compositions and other paper products, as described herein.

The fibrous substrate comprising cellulose may be microfibrillated in the presence of an inorganic particulate material to obtain microfibrillated cellulose having a $d_{50}$ ranging from about 5 to μm about 500 μm, as measured by laser light scattering. The fibrous substrate comprising cellulose may be microfibrillated in the presence of an inorganic particulate material to obtain microfibrillated cellulose having a $d_{50}$ of equal to or less than about 400 μm, for example equal to or less than about 300 μm, or equal to or less than about 200 μm, or equal to or less than about 150 μm, or equal to or less than about 125 μm, or equal to or less than about 100 μm, or equal to or less than about 90 μm, or equal to or less than about 80 μm, or equal to or less than about 70 μm, or equal to or less than about 60 μm, or equal to or less than about 50 μm, or equal to or less than about 40 μm, or equal to or less than about 30 μm, or equal to or less than about 20 μm, or equal to or less than about 10 μm.

The fibrous substrate comprising cellulose may be microfibrillated in the presence of an inorganic particulate material to obtain microfibrillated cellulose having a modal fibre particle size ranging from about 0.1-500 μm and a modal inorganic particulate material particle size ranging from 0.25-20 μm. The fibrous substrate comprising cellulose may be microfibrillated in the presence of an inorganic particulate material to obtain microfibrillated cellulose having a modal fibre particle size of at least about 0.5 μm, for example at least about 10 μm, or at least about 50 μm, or at least about 100 μm, or at least about 150 μm, or at least about 200 μm, or at least about 300 μm, or at least about 400 μm.

The fibrous substrate comprising cellulose may be microfibrillated in the presence of an inorganic particulate material to obtain microfibrillated cellulose having a fibre steepness equal to or greater than about 10, as measured by Malvern. Fibre steepness (i.e., the steepness of the particle size distribution of the fibres) is determined by the following formula:

$$\text{Steepness} = 100 \times (d_{30}/d_{70})$$

The microfibrillated cellulose may have a fibre steepness equal to or less than about 100. The microfibrillated cellulose may have a fibre steepness equal to or less than about 75, or equal to or less than about 50, or equal to or less than about 40, or equal to or less than about 30. The microfibrillated cellulose may have a fibre steepness from about 20 to about 50, or from about 25 to about 40, or from about 25 to about 35, or from about 30 to about 40.

A suitable procedure for characterising the particles size distribution of microfibrillated cellulose, and mixtures of inorganic particulate material and microfibrillated cellulose, is described in WO-A-2010/131016, at page 40, line 32 to page 41 line, 34.

Grinding Medium According to Third, Fourth and Fifth Aspects, Optionally for Use in First and Second Aspects The particulate ceramic grinding medium of the third aspect has (i) a surface roughness of at least about 0.5 μm, or (ii) a mean coefficient of friction of at least about 0.10, or both (i) and (ii). The grinding medium is formed by sintering a composition comprising at least one of zirconia ($ZrO_2$), e.g., ceria-stabilised zirconia, and alumina ($Al_2O_3$).

In certain embodiments, the composition comprises zirconia ($ZrO_2$), meaning that the particulate ceramic grinding medium formed by sintering such a composition will contain a zirconia phase.

In certain embodiments, the composition further comprises from about 5 wt. % to about 25 wt. % ceria ($Ce_2O_3$), based on the total weight of the composition, for example, from about 10 wt. % to about 20 wt. % ceria, or from about 12 wt. % to about 18 wt. % ceria, or from about 10 wt. % to about 15 wt. % ceria, or from about 11 wt. % to about 14 wt. % ceria, or from about 11 wt. % to about 13 wt. % ceria. Additionally, the composition may comprise at least about 40 wt. % zirconia, for example, from about 40 wt. % to about 90 wt. % zirconia, or from about 40 wt. % to about 80 wt. % zirconia, or from about 50 wt. % to about 70 wt. % zirconia, or from about 55 wt. % to about 70 wt. zirconia, or from about 60 wt. % to about 75 wt. % zirconia, or from about 65 wt. % to about 75 wt. % zirconia, or from about 65 wt. % to about 70 wt. % zirconia, based on the total weight of the composition. Additionally, the composition may comprise up to about 40 wt. % alumina, for example, up to about 30 wt. % alumina, or from about 1 wt. to about 40 wt. % alumina, or from about 5 wt. % to about 30 wt. % alumina, or from about 10 wt. % to about 25 wt. % alumina, or from about 10 wt. % to about 20 wt. alumina, or from about 12 to about 20 wt. % alumina, or from about 14 wt. % to about 20 wt. % alumina, or from about 14 to about 18 wt. % alumina.

In embodiments in which the composition comprises ceria and zirconia, or ceria, zirconia and alumina, the ceria and zirconia may be in the form of a ceria-stabilised zirconia. In certain embodiments, the ceria-stabilized zirconia comprises from about 10 wt. % to about 20 wt. % ceria, and up to about 90 wt. % zirconia, based on the total weight of the ceria stabilized zirconia, for example, from about 12 to about 18 wt. ceria and up to about 88 wt. % zirconia, or from about 14 wt. % to about 16 wt. % and up to about 86 wt. % zirconia, or up to about 85 wt. % zirconia, or up to about 84 wt. zirconia.

In certain embodiments, the ceria-stabilised zirconia comprises no more than about 2 wt. % iron oxide, for example, no more than about 1 wt. % iron oxide, or no more than about 0.75 wt. % iron oxide, or no more than about 0.5 wt. % iron oxide, or from about 0.1 wt. % to about 0.75 wt. % iron oxide, or from about 0.2 wt. % to about 0.6 wt. iron oxide.

In certain embodiments, the composition comprises at least about 10 wt. % alumina with the balance ceria-stabilised zirconia (which may comprise a minor amount of iron oxide, as described above) in which the ceria-stabilized zirconia contains relative amounts of ceria and zirconia as described above. In certain embodiments, the composition comprises from about 10 wt. % to about 30 wt. % alumina, with the balance ceria stabilized zirconia, for example about 15 wt. % to about 25 wt. alumina, with the balance ceria-stabilized zirconia.

In certain embodiments, the composition comprises from about 15 wt. % to about 25 wt. % alumina, from about 10 wt. % to about 15 wt. % ceria, and from about 50 wt. % to about 75 wt. % zirconia.

In certain embodiments, the particulate ceramic grinding medium is formed by sintering a composition comprising at least about 90 wt. % alumina, for example, at least about 95 wt. % alumina, or at least about 99 wt. % alumina, or at least about 99.5 wt. alumina, or at least about 99.9 wt. %, or substantially 100 wt. % alumina. For example, the particulate grinding medium may be made by sintering an alumina-containing material, such as, for example, technical grade alumina, bauxite or any other suitable combination of oxides thereof.

In certain embodiments, the particulate ceramic grinding medium according to the third and fourth aspects, is obtainable by a method comprising:

a. obtaining, providing or making a composition comprising raw materials suitable for making the ceramic grinding medium;

b. mixing the composition comprising raw materials, forming a mixture;

c. combining the mixture with binder and/or solvent, forming a bound mixture;

d. granulating the bound mixture by mixing the bound mixture over a period of time during which the mixing speed is reduced;

e. optionally drying the granulated composition;

f. optionally shaping the granulated composition;

g. optionally sizing the granulated composition; and h. sintering the granulated composition.

In certain embodiments, the raw materials in step b) of the method are homogenized, e.g., by mixing, forming a homogenized composition. By 'homogenized' is meant that the mixture of raw materials has a uniform composition throughout. In such embodiments, the homogenized composition is combined with binder and/or solvent in step c), forming a bound homogenized composition, which is granulated in step d) by mixing the bound homogenized composition over a period of time during which the mixing speed is reduced.

The binding agent and/or solvent is one of those well known in the industry. Possible binding agents include, for example, methyl cellulose, polyvinyl butyrals, emulsified acrylates, polyvinyl alcohols, polyvinyl pyrrolidones, polyacrylics, starch, silicon binders, polyacrylates, silicates, polyethylene imine, lignosulfonates, alginates, etc. In certain embodiments, a polyvinyl alcohol binder is used.

Possible solvents may include, for example, water, alcohols, ketones, aromatic compounds, hydrocarbons, etc.

Other additives well known in the industry may be added as well. For example, lubricants may be added, such as ammonium stearates, wax emulsions, oleic acid, Manhattan fish oil, stearic acid, wax, palmitic acid, linoleic acid, myristic acid, and lauric acid. Plasticizers may also be used, including polyethylene glycol, octyl phthalates, and ethylene glycol.

In certain embodiments, homogenizing comprises mixing the composition comprising raw materials for a suitable period of time such that the mixture of raw materials has a uniform composition throughout. In certain embodiments, step c) comprises mixing the homogenized composition with the binder and/or solvent. In certain embodiments, the mixing speed during step b) is greater than the mixing step in step c), and an initial mixing speed in step d) is no greater than a final mixing speed in step c).

In certain embodiments, mixing or homogenizing in step b) comprises mixing the composition comprising raw materials for a period of time from about 1 minute to about 60 minutes, for example, from about 1 minute to about 30 minutes, or from about 1 minute to about 20 minutes, or from about 1 minute to about 10 minutes, or from about 2 minutes to about 10 minutes, or from about 2 minutes to about 8 minutes, or from about 2 minutes to about minutes. Typically, the mixing speed is held constant during step b).

In certain embodiments, combining, e.g. mixing, the mixture or homogenized composition with the binder and/or solvent may be carried over a period of time of from about 30 seconds to about 30 minutes, for example, from about 30 seconds to about 20 minutes, or from about 30 seconds to about 10 minutes, or from about 1 minute to about 8 minutes, or from about 1 minute to about 5 minutes, or from about 2 minutes to about 5 minutes, or from about 2 minutes to about 4 minutes. As described above, the mixing speed during step c) is preferably less than the mixing speed in step b), and optionally at least the same as or greater than the initial mixing speed in step d). The binder and/or solvent may be added slowly during this step, e.g., continuously, or intermittently, preferably continuously. Alternatively, the all of the binder and/or solvent may be added at the beginning of mixing.

In certain embodiments, granulating the homogenized, bound composition, comprises mixing the composition over a period of time during which the mixing speed is gradually or stepwise reduced. A suitable period of time may be from about 1 minute to about 60 minutes, for example, from about 2 minutes to about 30 minutes, or from about 3 minutes to about 20 minutes, or from about 4 minutes to about 15 minutes, or from about 4 minutes to about 12 minutes, or from about 4 minutes to about 10 minutes, or from about 4 minutes to about 8 minutes. During the suitable period of time, the mixing speed may be reduced, e.g., stepwise, such that the final mixing speed is at least about 25% less than the initial mixing speed in step d), for example, at least about 30% less, or at least about 35% less, or at least about 40% less, or at least about 45% less than the initial mixing speed in step d).

In certain embodiments, an initial mixing speed in step b) is at least about 150% greater than a final mixing speed in step d), for example, at least about 175% greater, or at least about 190% greater, or at least about 200% greater, or at least about 210% greater.

The various mixing stages may be performed in any suitable mixing apparatus, for example, a mixer equipped with an impeller. An exemplary mixing apparatus is an Eirich mixer type RV02E equipped with a pin type impeller.

In certain embodiments, the initial impeller speed in step b) is between about 2750 and 3250 rpm, and the final impeller speed in step d) is between about 600 and 1200 rpm. In certain embodiments, the impeller speed in step b) is between about 2750 and 3250 rpm, and the impeller speed during step c) is between about 2000 and 2500 rpm. In such embodiments, the initial impeller speed in step d) is no greater than, preferably less than the impeller speed during step c), for example, less than about 2000 rpm, or less than about 1900 rpm, or less than about 1800 rpm. In such embodiments, the final impellor speed in step d) may be less than about 1500 rpm, for example, less than about 1200 rpm, or less than about 1000 rpm, or less than about 800 rpm. The final mixing speed, e.g., final impeller speed, may be held constant for a period of time ranging from about 1 minute to about 10 minutes, for example, from about 1 minute to about 8 minutes.

Following granulation, the granulated composition may be removed from the mixer and dried. For example, at a temperature of up to about 120° C. for a suitable period of time, e.g., from about 10 minutes to about 5 hours, or from about 30 minutes to about 2 hours. Before or during drying the granulated composition may be shaped, e.g., to form rod-shaped particles.

The optionally dried composition may then be subjected to a sizing process, e.g., by sieving. An appropriately sized sieve may be selected corresponding to the desired size of particulate grinding medium.

The particulated composition is then sintered at a suitable sintering temperature. Suitable sintering temperatures range from about 1200° C. to about 1700° C. The well time during sintering may range from about 1 hour to about 24 hours, for example, from about 2 hours to about 12 hours, or from about 2 hours to about 8 hours, or from about 2 hours to about 6 hours, or from about 3 hours to about 5 hours, or from about 3.5 hours to about 4.5 hours.

For embodiments in which the particulate ceramic grinding media is formed from a composition comprising at least ceria and zirconia, the sintering temperature is advantageously from about 1400° C. to about 1500° C., for example, from about 1425° C. to about 1475° C., or from about 1440° C. to about 1460° C., and a dwell time of from about 2 hours to about 6 hours, for example, from about 3 hours to about 5 hours, or from about 3.5 hours to about 4.5 hours.

For embodiments in which the particulated composition is formed from a composition comprising at least about 90 wt. % alumina, the sintering temperature is advantageously from about 1500° C. to about 1700° C., for example, from about 1550° C. to about 1650° C., or from about 1575° C. to about 1625° C., and a dwell time of from about 2 hours to about 6 hours, for example, from about 3 hours to about 5 hours, or from about 3.5 hours to about 4.5 hours.

In certain embodiments, the particulate grinding medium of the third aspect may have a surface roughness and/or mean coefficient as described above in connection with the particular grinding medium used in the method according to the first aspect of the present invention. As such, in certain embodiments, the grinding medium of the third aspect wears rough during the during the grinding process in which it is to be used, for example, during grinding in a method according to the first aspect of the present invention described herein.

Also provided, in accordance with the fourth aspect, is a particulate grinding medium which wears rough during the grinding process in which it is to be used, for example, during grinding in a method according to the first aspect of the present invention described herein. In certain embodiments, the particulate grinding medium of the fourth aspect may have a surface roughness and/or mean coefficient as described above in connection with the particular grinding medium used in the method according to the first aspect of the present invention. In certain embodiments, the particulate grinding medium which wears rough during grinding has, at the beginning of grinding, (i) a surface roughness of at least about 0.5 µm, or (ii) a mean coefficient of friction of at least about 0.10, or both (i) and (ii). Said particulate grinding medium may be formed of natural or synthetic material, for example, formed of a dense, hard mineral, ceramic or metallic material suitable for use as a grinding media. In certain embodiments, the particulate grinding medium is a ceramic grinding medium. Such materials include alumina, zirconia, zirconium silicate, yttria, ceria, or yttria and/or ceria stabilized zirconia, and mixtures thereof.

In certain embodiments, the particulate grinding medium according to the third and fourth aspects has a specific gravity of at least about 3.5, for example, a specific gravity of from about 3.5 to about 8.0, for example, from about 3.5 to about 7.0, or from about 3.5 to about 6.5, or a specific gravity of at least about 3.6, or at least about 3.7, or at least about 3.8, or at least about 3.9, or at least about 4.0, or at least about 4.1, or at least about 4.2, or at least about 4.3, or at least about 4.4, or at least about 4.5, or at least about 4.6, or at least about 4.7, or at least about 4.8, or at least about 4.9, or at least about 5.0, or at least about 5.1, or at least about 5.2, or at least about 5.3, or at least about 5.4, or at least about 5.5, or at least about 5.6, or at least about 5.6, or at least about 5.7, or at least about 5.8, or least about 5.9, or at least about 6.0.

In certain embodiments, the particulate grinding medium is used in the manufacture of microfibrillated cellulose. In certain embodiments, particulate grinding medium is used for improving one or more properties of the microfibrillated cellulose and/or for reducing the energy input per unit amount of microfibrillated cellulose produced.

In certain embodiments, the particulate grinding medium according to the fourth and fifth aspects are used in a method for manufacturing microfibrillated cellulose, said method comprising a step of microfibrillating a fibrous substrate comprising cellulose by grinding in the presence of the particulate grinding medium which is to be removed after the completion of grinding.

In certain embodiments, a material is provided which wears rough or roughens when agitated in the presence of a fibrous substrate comprising cellulose. In certain embodiments, the material, in particulate form, wears rough or roughens when ground in the presence of a fibrous substrate comprising cellulose to produce microfibrillated cellulose, as described herein. For the avoidance of doubt, the material which wears rough or roughens is other than the inorganic particulate material described herein which according to certain embodiments may be co-ground with the fibrous substrate comprising cellulose. In certain embodiments, the material is a grinding media, for example, a grinding media according to certain embodiments described herein. By "wears rough" or "roughens" is meant that surface of the material measurably roughens following agitation. The increase in surface roughness may be visually discernible or determined in accordance with the methods described herein. In certain embodiments, the material has a specific gravity of at least about 3.5.

According to certain embodiments, provided is an unpolished particulate grinding media having a surface roughness which increases by at least about 1% when subject to abrasive contact. By "unpolished" is meant that the grinding media has not been subjected to any polishing treatment (i.e., to smoothen its surface) prior to its use as a grinding media. The increase in surface roughness may be determined in accordance with the methods described herein. In certain embodiments, the unpolished particulate grinding media has a surface roughness of at least about 0.5 µm, and/or (ii) a mean coefficient of friction of at least about 0.10 prior to abrasive contact. Abrasive contact may be an autogenous process (e.g., agitation in a mill or other suitable grinding apparatus) or may be conducted in the presence of another material, for example, another grinding media which, following abrasive contact, is separable from the unpolished particulate grinding media or, for example, a fibrous substrate comprising cellulose which, during abrasive contact, may be ground producing microfibrillated cellulose (e.g., microfibrillated cellulose according to embodiments described herein).

In certain embodiments, the surface roughness increases by at least about 5%, or at least about 10%, or at least about 15%, or at least about 20%, or at least about 25%, or at least about 30%, or at least about 35%, or at least about 40%, or at least about 45%, or at least about 50%. In certain embodiments, the material has a specific gravity of at least about 3.5. In certain embodiments, the unpolished particulate grinding media, prior to abrasive contact, has a surface roughness of at least about 2.0 µm, and/or (ii) a mean coefficient of friction of at least about 0.20, for example, a surface roughness of at least about 2.2 µm, or a surface roughness of at least about 2.4 µm, or a surface roughness of at least about 2.6 µm, or a surface roughness of at least about 2.8 µm, or a surface roughness of at least about 3.0 µm.

In certain embodiments, provided is a polished particulate grinding media having a surface roughness which increases by at least about 20% when subject to abrasive contact. By "polished" is meant that the grinding media has been subjected to a polishing treatment (i.e., to smoothen its surface) prior to its use as a grinding media. The increase in surface roughness may be determined in accordance with the methods described herein. In certain embodiments, the polished particulate grinding media has a surface roughness of at least about 0.5 µm, and/or (ii) a mean coefficient of friction of at least about 0.10 prior to abrasive contact. Abrasive contact may be an autogenous process (e.g., agitation in a mill or other suitable grinding apparatus) or may be conducted in the presence of another material, for example, another grinding media which, following abrasive contact, is separable from the polished particulate grinding media or, for example, a fibrous substrate comprising cellulose which, during abrasive contact, may be ground producing microfibrillated cellulose (e.g., microfibrillated cellulose according to embodiments described herein). In certain embodiments, the surface roughness increases by at least about 25%, or at least about 30%, or at least about 35%, or at least about 40%, or at least about 45%, or at least about 50%. In certain embodiments, the material has a specific gravity of at least about 3.5. In certain embodiments, the polished particulate grinding media, prior to abrasive contact, has a surface roughness of at least about 1.4 µm, and/or (ii) a mean coefficient of friction of at least about 0.08, or at least about 0.10, for example, a surface roughness of at least about 1.6 µm, or a surface roughness of at least about 1.8 µm, or a surface roughness of at least about 1.9 µm.

Method of Making Particulate Grinding Medium

In certain embodiments, the particulate grinding medium may be made by any suitable method in which a particulate grinding having (i) a surface roughness of at least about 0.5

μm, or (ii) a mean coefficient of friction of at least about 0.10, or both (i) and (ii), is produced.

The method may comprise forming a particulate grinding medium which has a surface roughness of less than 0.5 μm and/or a mean coefficient of friction less than 0.10, and subjecting the particulate grinding medium to a surface roughening step such that the surface roughness is at least about 0.5 μm, and/or the mean coefficient of friction is at least about 0.10, at the end of the surface roughening step. For example, a particulate grinding medium initially not meeting the surface roughness and/or mean coefficient of friction requirements of the first aspect may be co-ground with an abrasive material, such as a micro abrasive powder (e.g., a fused alumina micro abrasive powder, in a grinding vessel, such as a planetary mill.

Advantageously, the particulate grinding medium of the first aspect (as well as the second, third, fourth and fifth aspects) may be made by a process comprising:

a. obtaining, providing or making a composition comprising raw materials suitable for making the ceramic grinding medium;

b. mixing the composition comprising raw materials, forming a mixture;

c. combining the mixture with binder, forming a bound mixture;

d. granulating the bound mixture by mixing the bound mixture over a period of time during which the mixing speed is reduced;

e. optionally drying the granulated composition;

f. optionally shaping the granulated composition;

g. optionally sizing the granulated composition; and h. sintering the granulated composition.

In certain embodiments, the raw materials in step b) of the method are homogenized, e.g., by mixing, forming a homogenized composition. In such embodiments, the homogenized composition is combined with binder and/or solvent in step c), forming a bound homogenized composition, which is granulated in step d) by mixing the bound homogenized composition over a period of time during which the mixing speed is reduced.

Further embodiments and details of such a process are described above in connection with making a particulate grinding medium according to the third and/or fourth aspects.

Paper Products and Processes for Preparing Same

The composition obtainable by the first aspect of the present invention comprising microfibrillated cellulose and (when present) inorganic particulate material can be incorporated in papermaking compositions, which in turn can be used to prepare paper products. The term paper product, as used in connection with certain embodiments of the present invention, should be understood to mean all forms of paper, including board such as, for example, white-lined board and linerboard, cardboard, paperboard, coated board, and the like. There are numerous types of paper, coated or uncoated, which may be made according to certain embodiments of the present invention, including paper suitable for books, magazines, newspapers and the like, and office papers. The paper may be calendered or super calendered as appropriate; for example super calendered magazine paper for rotogravure and offset printing may be made according to the present methods. Paper suitable for light weight coating (LWC), medium weight coating (MWC) or machine finished pigmentisation (MFP) may also be made according to the present methods. Coated paper and board having barrier properties suitable for food packaging and the like may also be made according to the present methods.

In a typical papermaking process, a cellulose-containing pulp is prepared by any suitable chemical or mechanical treatment, or combination thereof, which are well known in the art. The pulp may be derived from any suitable source such as wood, grasses (e.g., sugarcane, bamboo) or rags (e.g., textile waste, cotton, hemp or flax). The pulp may be bleached in accordance with processes which are well known to those skilled in the art and those processes suitable for use in certain embodiments of the present invention will be readily evident. The bleached cellulose pulp may be beaten, refined, or both, to a predetermined freeness (reported in the art as Canadian standard freeness (CSF) in $cm^3$). A suitable paper stock is then prepared from the bleached and beaten pulp.

The papermaking composition typically comprises, in addition to the composition comprising microfibrillated cellulose and (when present) inorganic particulate material, paper stock and other conventional additives known in the art. For example, a papermaking composition may comprise up to about 50% by weight inorganic particulate material derived from the composition comprising microfibrillated cellulose and inorganic particulate material based on the total dry contents of the papermaking composition. For example, the papermaking composition may comprise at least about 2% by weight, or at least about 5% by weight, or at least about 10% by weight, or at least about 15% by weight, or at least about 20% by weight, or at least about 25% by weight, or at least about 30% by weight, or at least about 35% by weight, or at least about 40% by weight, or at least about 45% by weight, or at least about 50% by weight, or at least about 60% by weight, or at least about 70% by weight, or at least about 80% by weight, or at least about 90% by weight of inorganic particulate material derived from the composition comprising microfibrillated cellulose and inorganic particulate material, based on the total dry contents of the papermaking composition. The papermaking composition may also contain a non-ionic, cationic or an anionic retention aid or microparticle retention system in an amount in the range from about 0.1 to 2% by weight, based on the dry weight of the aqueous suspension comprising microfibrillated cellulose and inorganic particulate material. It may also contain a sizing agent which may be, for example, a long chain alkylketene dimer, a wax emulsion or a succinic acid derivative. The composition may also contain dye and/or an optical brightening agent. The composition may also comprise dry and wet strength aids such as, for example, starch or epichlorhydrin copolymers.

Paper products according to certain embodiments of the present invention may be made by a process comprising: (i) obtaining or preparing a fibrous substrate comprising cellulose in the form of a pulp suitable for making a paper product; (ii) preparing a papermaking composition from the pulp in step (i), the composition of certain embodiments of this invention comprising microfibrillated cellulose and (when present) inorganic particulate material, and other optional additives (such as, for example, a retention aid, and other additives such as those described above); and (iii) forming a paper product from said papermaking composition. As noted above, the step of forming a pulp may take place in the grinder vessel by addition of the fibrous substrate comprising cellulose in a dry state, for example, in the form of a dry paper broke or waste, directly to the grinder vessel. The aqueous environment in the grinder vessel will then facilitate the formation of a pulp.

An additional filler component (i.e., a filler component other than the inorganic particulate material which may be co-ground with the fibrous substrate comprising cellulose)

can be added to the papermaking composition prepared in step (ii). Exemplary filler components are PCC, GCC, kaolin, or mixtures thereof. Paper products made from such papermaking compositions may exhibit greater strength (e.g., improved burst strength) compared to paper products comprising microfibrillated cellulose made by a comparable process in which the particulate grinding medium used in the process has at the beginning of grinding (i) a surface roughness which is less rough and/or (ii) a lesser mean coefficient of friction than that required by the method of the first aspect of the present invention. Similarly, paper products prepared from a papermaking composition according to certain embodiments of the present invention comprising inorganic particulate may exhibit a strength which is comparable to paper products comprising less inorganic particulate material. In other words, paper products can be prepared from a paper making composition according to certain embodiments of the present invention at higher filler loadings without loss of strength.

The steps in the formation of a final paper product from a papermaking composition are conventional and well know in the art and generally comprise the formation of paper sheets having a targeted basis weight, depending on the type of paper being made.

EXAMPLES

Example 1

Raw material compositions as described in Table 1 were each filled into an Eirich mixer type RV02E equipped with a pin type impeller and de-agglomerated and homogenized for 4 minutes at an impeller speed of 3000 rpm. In a second step, in each case, the impeller speed was lowered to 2200 rpm and binder solution (a 0.5 wt. % PVA solution in water) was added over a period of 3 minutes. In a mixing step (i.e., granulation), the impeller speed was stepwise reduced to a final speed to form beads. Details of the final step mixing for each composition are provided in Tables 2A and 2B.

The beads were removed from the mixer and dried at 60° C. for 1 hour. The dried material was sieved. In each case, a size fraction was used for sintering. For the 100% alumina beads (Sample 2A) the sintering temperature was 1600° C. and a dwell time of 4 hours. For the ceria/yttria/alumina beads (Samples 2B and 2C) the sintering temperature was 1450° C. and a dwell time of 4 hours.

TABLE 1

| Sample | Raw material composition | Amount of material in mixer |
|---|---|---|
| 2A | 100 wt. % alumina | 5.5 kg |
| 2B | 20 wt. % alumina/80 wt. % of 14.5 wt. % ceria stabilised zirconia* | 6.5 kg |
| 2C | 50 wt. % alumina/50 wt. % of 14.5 wt. % ceria stabilised zirconia* | 6.5 hg |

*15.5 wt. % $Ce_2O_3$, 84 wt. % $ZrO_2$, 0.5 wt. % $Fe_2O_3$

TABLE 2A

| Impeller speed, rpm - Sample 2A | Time, min |
|---|---|
| 1750 | 2 |
| 1500 | 2 |
| 1100 | 2 |

TABLE 2B

| Impeller speed, rpm - Samples 2B & 2C | Time, min |
|---|---|
| 1750 | 2 |
| 1500 | 2 |
| 1000 | 5 |
| 750 | 5 |

The formulated beads of Sample 2B have a specific gravity of 5.57; formulated beads of Sample 2C have a specific gravity of 4.74.

Example 2

Beads samples 2B and 2C and a comparative zirconia media were used to prepare microfibrillated cellulose.

Ingredients used in the production of microfibrillated cellulose:
 unrefined Botnia pulp
 ground calcium carbonate having a particle size distribution such that about 60 wt. % of the particles have an p.s.d. of less than 2 μm
 grinding media 2B and 2C
 comparative zirconia grinding media having a surface roughness of less than 0.5 μm
Grinding Conditions:
 Target total solids and POP (Percentage Of Pulp—percentage of the filler dry weight that is pulp): 9% and 20% POP respectively
 Target total solids and POP: 15% and 20% POP respectively
 Target MVC (media volume concentration): 45%
 1000 rpm
 Energy input—2000, 2500 and 3500 kWh/t Each media type was split into 3 equal portions. Each portion was then used for grinding at only one specific energy level for 8 batches without mixing the different portions.

Microfibrillated cellulose samples produced were analysed as follows:
 Particle size distribution was determined using Malvern 'S' instrument, in accordance with the method described above,
 Total Solids Content and POP of Samples were Measured The products prepared according to the above procedures were evaluated as fillers in handsheets. Generally, a batch of bleached chemical pulp comprising 70 parts eucalyptus and 30 parts northern bleached softwood pulp was beaten in a valley beater to give a CSF of 520 $cm^3$. After disintegration and dilution to 2% thick stock, the fibre was diluted to 0.3 wt. % consistency for sheet making.

Filler slurry (comprising the microfibrillated cellulose and calcium carbonated particulate) was added together with retention aid (Ciba, Percol 292, 0.02 wt. % on furnish). Handsheets were made to a basis weight of 80 $gm^{-2}$ using a British handsheet mold according to standard methods (e.g. SCAN C 26:76 (M 5:76). Sheets were prepared at approximately 15 and 25 parts inorganic particulate loading and the burst strength value at 20% inorganic particulate loading interpolated from these data. The burst at 20% loaded was expressed as a percentage of the unfilled value, and then the normalized for comparison.

Paper burst strength was determined using a Messemer Buchnel burst tester according to SCAN P24.

Results are summarised in FIG. 1. It is seen that microfibrillated cellulose produced using media samples 2B and 2C gave better strength improvement when incorporated in paper compared to microfibrillated cellulose produced using the zirconia media. Moreover, microfibrillated cellulose produced using media samples 2B and 2C at an energy input of 2000 kWh/t gave better strength improvement than microfibrillated cellulose produced using zirconia media at a higher energy input of 2500 kWh/t.

Example 3

Analysis of Media after Grinding

Beads were collected after every other grind and analysed/characterised using an interferometer and tribometer, in accordance with the methods described in Appendices 1 and 2 below. The interferometer was used to characterize the media surface roughness and the tribometer was used to determine the coefficient of friction of the media when rubbed over a dry fibre pad (made from softwood, Botnia pine).

The interferometer used was a phase shifting interferometer which uses monochromatic light (Omniscan MicroXAM2) to measure the media surface roughness and topography.

A Longshore Systems Engineering tribometer was used to determine the coefficient of friction of the bead samples.

Results are summarised in Table 3.

TABLE 3

|  |  | $S_a$ | | Mean Coef. of Friction (μ) |
|---|---|---|---|---|
|  |  | μm | St. Err |  |
| Zirconia | Used | 0.36 | 0.03 | 0.164 |
| Media 2B | As Received | 6.10 | 0.86 | 0.466 |
|  | After 2 grinds | 3.48 | 0.32 | 0.346 |
|  | After 4 grinds | 5.68 | 0.73 | 0.323 |
|  | After 6 grinds | 3.49 | 0.14 | 0.309 |
|  | After 8 grinds | 3.11 | 0.29 | 0.264 |
| Media 2C | As Received | 4.57 | 0.75 | 0.321 |
|  | After 2 grinds | 2.95 | 0.23 | 0.370 |
|  | After 4 grinds | 2.91 | 0.30 | 0.290 |
|  | After 6 grinds | 2.15 | 0.14 | 0.283 |
|  | After 8 grinds | 2.93 | 0.27 | 0.229 |

$S_a$ = average surface roughness (arithmetic mean)

APPENDIX 1

Interferometer Operation
(Omniscan MicroXAM2
1. Switch power on
2. Boot up PC
3. Stick down 5 specimen particles onto a glass slide (measure roughness at two locations of each particle)
4. Locate each specimen particle directly under the light beam, preferably focusing directly on top of the particle. An image will appear on the screen/monitor, which will not be clear (blurry)
5. Alter the light intensity so that there is a red spot in the middle of the picture (the red spot should not cover the full image on the screen)
6. Check if the red spot becomes smaller on moving the lens down (anti clockwise on dial) towards the particle. The image becoming more out of focus.
7. Then bring the lens back up to the position it was before, and then turn the light intensity down so that the red dot is much smaller and less defined.
8. Then slowly keep moving the lens up (clockwise on dial) until the image comes into focus (the particle surface becomes more defined). Turn the light intensity down if needed so the red light is more sparse and less bold
9. When the image is in focus, tare the position of the lens on the control box
10. Then run the sample (after entering the correct file name), abort the process when it is clear the picture has completely come out of focus
11. With the image that is displayed you can crop out any anomalies by using the crop button on the left, and right clicking to select 'make main image'. Then save.
12. Read off the required value from the image
13. Repeat for second area of particle.
14. Repeat for each particle.
15. Average the 10 readings obtained.

APPENDIX 2

Tribometer Operating Procedure
Sphere on Flat Friction Measurements
1. Switch power on to PC, monitor and Tribometer.
2. Boot up PC.
3. Press [Start] on the Tribometer touch screen interface (TSI).
4. Press the Start button on the rear of the Tribometer controller.
5. Press [Proceed] on the TSI.
6. Press [Linear] on the TSI.
7. Open DSC Toolkit software.
8. In the DSC Toolkit, select device which is the tribometer (which is the Normal Load strain gauge).
9. Open DSC Toolkit software.
10. In the DSC Toolkit select device which is the tribometer (which is the Lateral Load strain gauge).
11. Adhere probe to screw with metric thread of M2, M3, M4, M5 or M6, depending on the sphere diameter.
12. Attach screw to Tribometer beam via the appropriate adaptor.
13. Add brass weights until the target Normal Load is achieved.
14. Immobilise substrate (which is a dry fibre pad made from softwood, Botnia pine) on the lower plate.
The fibre pad is trimmed to dimensions suitable for using the in-built system for immobilising samples.
15. Using the TSI, input the Start position and End position; these should be the same value, corresponding to where you wish the friction measurement to begin on your sample.
16. Using the TSI, input the desired sliding velocity.
17. Using the TSI, set the number of cycles to 1.
18. Press [Logging] on the DSC Toolkit software.
19. Set the Log Interval to 10 ms.
20. Specify the filename and directory.
21. Lower the crosshead until the sphere makes compressive contact with the substrate, and the Normal Load reaches zero.
22. Using the TSI, press [Begin Motion].
23. Press [Start] on the DSC Toolkit software.
24. Using the TSI, press [Run].
25. Once the cycle has completed, Press [Stop] on the DSC Toolkit software.
26. Raise the crosshead until the sphere is clear of the substrate.

The invention claimed is:

1. A method for making a particulate ceramic grinding medium having (i) a surface roughness of at least about 0.5 µM, or (ii) a mean coefficient of friction of at least about 0.10, or both (i) and (ii), wherein the particulate grinding medium has a specific gravity of at least 3.5, said method comprising:
   a. obtaining, providing or making a composition comprising raw materials comprising at least one of zirconia ($ZrO_2$) and alumina ($Al_2O_3$), wherein the composition further comprises ceria ($CeO_2$) from about 10 to about 20 wt. % ceria, based on the total weight of the composition;
   b. mixing the composition comprising raw materials, forming a mixture;
   c. combining the mixture with binder, forming a bound mixture;
   d. granulating the bound mixture by mixing the bound mixture composition over a period of time during which the mixing speed is reduced;
   e. optionally drying the granulated composition;
   f. optionally shaping the granulated composition;
   g. optionally sizing the granulated composition; and
   h. sintering the granulated composition, optionally
   wherein steps b) to d) are performed in a mixer equipped with an impeller,
   wherein the impeller speed during step b) is greater than the impellor speed during steps c) and d), and
   wherein the impeller speed during step c) is equal to or greater than the impellor speed during step d).

2. The method according to claim 1, wherein the composition comprising raw materials comprises up to about 90 wt. % ceria stabilized zirconia, and optionally at least about 10 wt. % alumina.

3. The method according to claim 2, wherein the sintering temperature is from about 1400° C. to about 1500° C.

4. The method according to claim 2, wherein the sintering temperature is from about 1425° C. to about 1475° C.

5. The method according to claim 2, wherein the sintering temperature is from about 1440° C. to about 1460° C.

6. The method according to claim 3, wherein the dwell time is of from about 2 hours to about 6 hours.

7. The method according to claim 3, wherein the dwell time is of from 3 hours to about 5 hours.

8. The method according to claim 3, wherein the dwell time is of from about 3.5 hours to about 4.5 hours.

9. The method according to claim 1, wherein the composition comprising raw materials comprising up to about 40 wt. % alumina.

10. The method according to claim 1, wherein the composition comprising raw materials comprising up to about 30 wt. % alumina.

11. The method according to claim 1, wherein the composition comprising raw materials comprising from about 1 wt. % to about 40 wt. % alumina.

12. The method according to claim 1, wherein the composition comprising raw materials comprising from about 5 wt. % to about 30 wt. % alumina.

13. The method according to claim 1, wherein the composition comprising raw materials comprising from about 10 wt. % to about 25 wt. % alumina.

14. The method according to claim 1, wherein the composition comprising raw materials comprising from about 12 wt. % to about 20 wt. % alumina.

15. The method according to claim 9, wherein the sintering temperature is from about 1500° C. to about 1700° C.

16. The method according to claim 9, wherein the sintering temperature is from about 1550° C. to about 1650° C.

17. The method according to claim 9, wherein the sintering temperature is from about 1575° C. to about 1700° C.

18. The method according to claim 15, wherein the dwell time is of from about 2 hours to about 6 hours.

19. The method according to claim 15 wherein the dwell time is of from about 3 hours to about 5 hours.

20. The method according to claim 15, wherein the dwell time is of from about 3.5 hours to about 4.5 hours.

21. A method for making a particulate ceramic grinding medium having (i) a surface roughness of at least about 0.5 µm, or (ii) a mean coefficient of friction of at least about 0.10, or both (i) and (ii), wherein the particulate grinding medium has a specific gravity of at least 3.5, said method comprising:
   a. obtaining, providing or making a composition comprising raw materials comprising at least one of zirconia ($ZrO_2$) and alumina ($Al_2O_3$), optionally wherein the composition further comprises ceria ($CeO_2$) from about 5 to about 25 wt. % ceria, based on the total weight of the composition, wherein the composition comprising raw materials comprises up to about 90 wt. % ceria stabilized zirconia, and optionally at least about 10 wt. % alumina;
   b. mixing the composition comprising raw materials, forming a mixture;
   c. combining the mixture with binder, forming a bound mixture;
   d. granulating the bound mixture by mixing the bound mixture composition over a period of time during which the mixing speed is reduced;
   e. optionally drying the granulated composition;
   f. optionally shaping the granulated composition;
   g. optionally sizing the granulated composition; and
   h. sintering the granulated composition, optionally
   wherein steps b) to d) are performed in a mixer equipped with an impeller,
   wherein the impeller speed during step b) is greater than the impellor speed during steps c) and d), and
   wherein the impeller speed during step c) is equal to or greater than the impellor speed during step d).

22. The method according to claim 21, wherein the composition comprises ceria ($CeO_2$) from about 10 to about 20 wt. %.

23. The method according to claim 21, wherein an initial mixing speed in step b) is at least about 150% greater than a final mixing speed in step d) and/or wherein the initial mixing speed is between about 2750 and 3250 rpm, and the final mixing speed is between about 600 and 1200 rpm.

24. The method according to claim 21, wherein the sintering temperature is from about 1400° C. to about 1500° C.

25. The method according to claim 21, wherein the sintering temperature is from about 1425° C. to about 1475° C.

26. The method according to claim 21, wherein the sintering temperature is from about 1440° C. to about 1460° C.

27. The method according to claim 24, wherein the dwell time is of from about 2 hours to about 6 hours.

28. The method according to claim 24, wherein the dwell time is of from 3 hours to about 5 hours.

29. The method according to claim 24, wherein the dwell time is of from about 3.5 hours to about 4.5 hours.

30. The method according to claim 21, wherein the composition comprising raw materials comprises at least 90 wt. % alumina.

31. The method according to claim 21, wherein the composition comprising raw materials comprises at least 95 wt. % alumina.

32. The method according to claim 21, wherein the composition comprising raw materials comprises at least 99 wt. % alumina.

33. The method according to claim 21, wherein the composition comprising raw materials comprises at least 99.5 wt. % alumina.

34. The method according to claim 21, wherein the composition comprising raw materials comprises at least 99.9 wt. % alumina.

35. The method according to claim 21, wherein the composition comprising raw materials comprises substantially 100 wt. % alumina.

36. The method according to claim 30, wherein the sintering temperature is from about 1500° C. to about 1700° C.

37. The method according to claim 30, wherein the sintering temperature is from about 1550° C. to about 1650° C.

38. The method according to claim 30, wherein the sintering temperature is from about 1575° C. to about 1700° C.

39. The method according to claim 36, wherein the dwell time is of from about 2 hours to about 6 hours.

40. The method according to claim 36 wherein the dwell time is of from about 3 hours to about 5 hours.

41. The method according to claim 36, wherein the dwell time is of from about 3.5 hours to about 4.5 hours.

* * * * *